United States Patent [19]
Miller

[11] 3,716,219
[45] Feb. 13, 1973

[54] ROLLER ALIGN DRIVE

[76] Inventor: Eugene J. Miller, 3912 W. Oak St., McHenry, Ill.

[22] Filed: Sept. 20, 1971

[21] Appl. No.: 181,770

[52] U.S. Cl. ............................................. 259/177 R
[51] Int. Cl. ............ B28c 5/18, B28c 5/42, F16h 7/14
[58] Field of Search .............................. 259/175–177

[56] References Cited

UNITED STATES PATENTS

| 2,599,852 | 6/1952 | McClain | 259/177 R |
| 2,944,799 | 7/1960 | Larson | 259/177 R |
| 3,136,165 | 6/1964 | Pitts | 259/177 R |

*Primary Examiner*—William I. Price
*Assistant Examiner*—Stuart S. Levy
*Attorney*—Watson D. Harbaugh et al.

[57] ABSTRACT

A mounting is disclosed imparting several degrees of freedom to fixed or semi-fixed drive units which maintains coplanar relationship between a drive sprocket or sheave and a driven sprocket or sheave and overcomes the tendency of the drive chain or belt to become detached or subject to extreme wear under the influence of displacement forces acting on their spaced axes. In one embodiment the mounting includes a traversing radial torque anchor in combination with a radial follower arm to support the drive member axis parallel to the axis of the driven member and to maintain the drive axis in a relatively fixed circumferential position to the driven axis. The follower arm has a roller intermediate its ends which rolls against the side of the driven member under bias and the extended end is pivoted to the journal holding the drive member in its drive position. Other embodiments are disclosed.

18 Claims, 6 Drawing Figures

PATENTED FEB 13 1973

INVENTOR:
EUGENE J. MILLER

By Harbaugh & Thomas
Attorneys

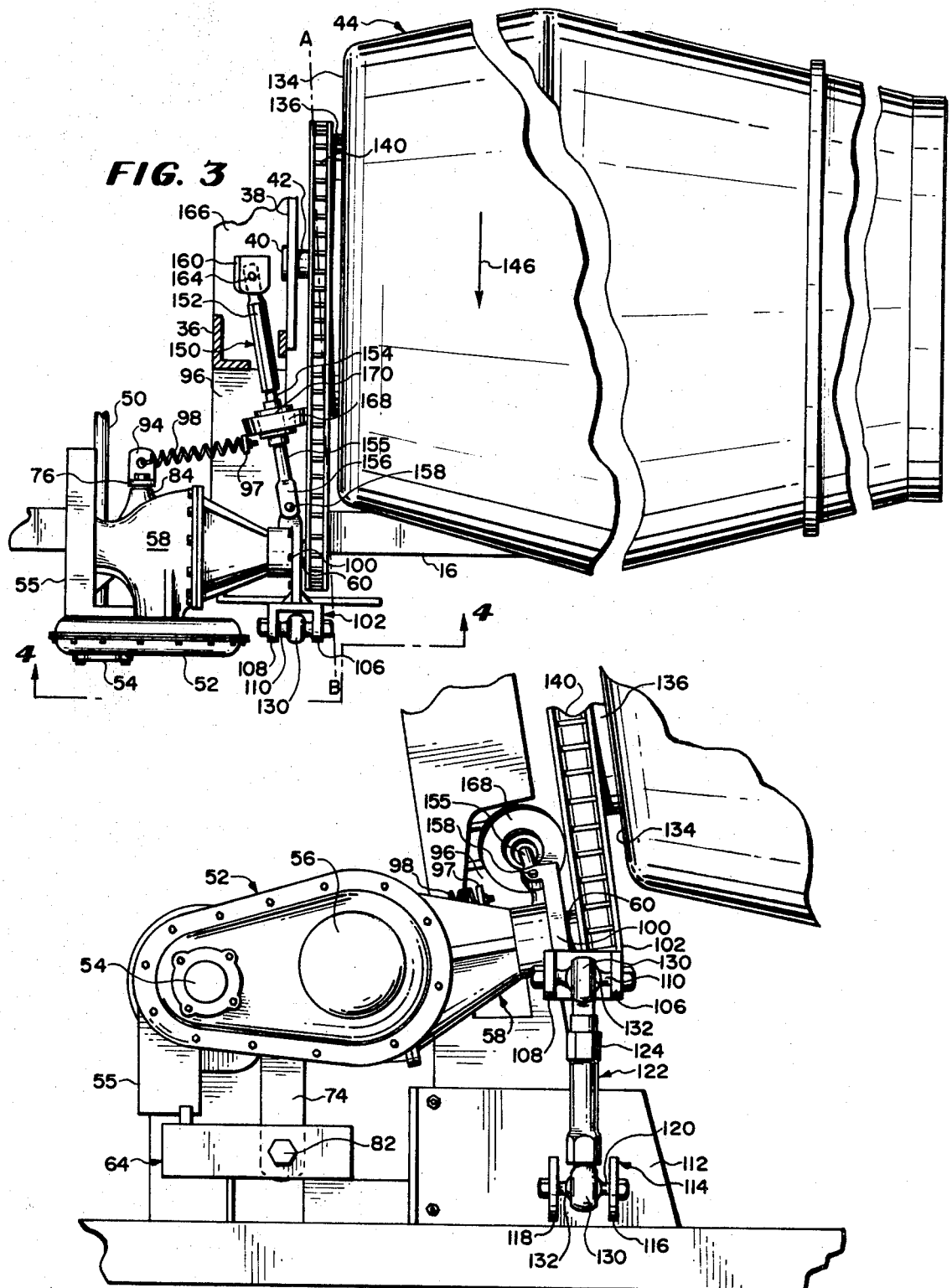

INVENTOR:
EUGENE J. MILLER

By Hartaugh & Thomas
Attorneys

ROLLER ALIGN DRIVE

BACKGROUND OF THE INVENTION

The problem of maintaining a drive sprocket in proper alignment with a driven sprocket is not acute in the ordinary installation where both the prime mover and the member to be driven are stationary or no other displacement forces act on the units. However, there are installations wherein exterior forces cause misalignment of the drive and driven sprockets wherein increased wear of these parts is experienced and difficulty is experienced in keeping the drive chain on the sprockets. A typical example comprises the chain drive units used on concrete ready-mix trucks wherein the prime mover rotates the heavy mixer drum carried on fore and aft bearing supports attached and supported on an angle to the horizontal plane of the frame of the vehicle. The mixer drums are also subjected to fore and aft moments of force due to braking and acceleration of the truck.

In this art, the mounting elements for the auxiliary drive connection between the truck frame and the mixing drum are fixed, or semifixed. The fixed mountings cannot be used for large trucks where the axis of rotation of the concrete drum has any tendency to shift in relation to the drive axis and are generally confined to use on smaller mixer trucks or small trailer mounted concrete mixers. The semi-fixed units are mounted for easy detachment for repair, are locked in place during use and no allowance for misalignment is provided. Any freedom of movement is lost by the locking and does not compensate for misalignment due to stresses on the parts or keep the roller chain on or aligned with the drive sprockets during all conditions of use.

Only such adjustments are provided by the prior art devices as are necessary to initially adjust and align the drive and driven sprockets at the time of installation, and to thereafter make adjustments for wear of the working parts or for easy disassembly for replacement, etc. Little or no attention is paid to the influence of displacement forces, such as the twisting of the frame of the vehicle as it negotiates uneven terrain. Only limited play or freedom of movement between the drive axis and the driven axis can and is obtained through the inherent looseness of bevel gearing, bearings and the chain drives that are used. Vibration dampening systems are employed with spring-mounted or gyroscope-controlled drive units where work under high speeds and low torque is performed. These systems are totally inadequate, too expensive and cannot be used under the extremely severe work conditions of the construction field. The problem of maintaining proper alignment of the drive and driven axes of heavy construction equipment is accentuated by the necessity of increased pay loads per vehicle and the need for off-the-road capability at many construction locations. Although the problem is not as severe in the sheave art where belt drives are used, misalignment can cause excessive wear and squeaking which are overcome by the use of the drive unit suspension of this invention. Those endless drive belt units wherein the belt has cleats to mesh with depressions in the sheave can benefit by the use of this invention.

SUMMARY OF THE INVENTION

This invention primarily concerns a suspension for chain drive units that provides the degrees of freedom of movement for the drive sprocket necessary to keep it in the plane of the driven sprocket so that the chain therebetween does not come off of the sprockets under the influence of exterior torque forces acting on the axis of either sprocket. More particularly, the suspension maintains the drive axis and the driven axis in the same plane and at a constant radial distance from each other as the driven axis is subjected to circular displacement at an end spaced from the driven member and also subjected to axial displacement in relation to the drive axis. Stated otherwise, the drive axis of a power take-off unit and the axis of the part being driven are normally perpendicular to the same plane, that in which the drive sprocket or sheave and the driven sprocket or sheave are rotating. The rotational axis of the driven member, with one fixed bearing support is subject to external forces which displace or off-set the plane of rotation of the driven member from that of the drive member. As this occurs, the suspension for the drive member of this invention allows or forces the drive member to constantly orient itself so that its plane of rotation always lies in the displaced plane of rotation of the driven member.

The suspension includes a multiple pivot linkage frame mounting for the drive member, and its power-take-off unit, for constant following movement with the changing plane of rotation of the driven member, under the control of an adjustable radial follower arm affixed between the supporting frame and the drive member or carried by the drive member, and pivoted or held in a plane normal to the combined planes of the drive and driven members which maintains the members in a substantially coplanar and fixed radial as well as circumferential relationship, and an adjustable traversing swivel means or linkage which torsionally anchors the drive member tangentially within and following the coplanar relationship thus established. The drive member is accordingly held by the suspension so that it is able to follow or remain in the plane of the driven sprocket as the axis of the latter shifts with the torsional and longitudinal forces absorbed by the frame of the truck or other structure. Although the invention will be illustrated in the drawings by reference to the component parts of a ready-mix truck, it is apparent to one skilled in the art that the suspension of this invention can be used in other applications where greater than normal torsional and thrust forces are applied to frame mounting for either the driven or drive member, whether connected by a chain or belt drive.

As used in this specification and claims, the term "drive unit" is meant to include any means having a rotatable drive member which is adapted to be used to rotate a driven member that is supported on a frame or other structure which is subject to displacement forces. The source of power for the drive unit can be a power take-off shaft, an electrical motor or a hydraulic motor as long as rotational power is applied to the drive member.

By "flexible means" is meant any means encompassing the periphery of the drive and driven members such as flat belts, V-belts, a series of belts, cleated belts, roller chains, silent chains and ropes to rotate them in unison. The suspension of this invention can be applied to power or drive units wherein the drive shaft is at any angle, that is, the drive shaft can be vertically oriented as well as the driven shaft. The drive system in which the suspension is used can be any pair of sheaves, pulleys or sprockets whose axes of rotation tend to move out of the proper orientation for effective operation regardless of how many other such driven, idler or loose pulleys may be in the system.

The axis of the drive member is essentially parallel to and radially spaced from the axis of the driven member, but can be located at any desired circumferential relationship therewith. The drive unit of this invention can be used for any frame-supported rotatable work or driven member wherein one or the other of its supporting journals or bearings is subjected to displacement. On a ready-mix truck both the drive axis and the driven axis may be canted in relation to the plane of the truck frame or be at an angle fore and aft of the frame.

DESCRIPTION OF THE DRAWINGS

The torque absorbing suspension drive unit of this invention is further illustrated by the drawings wherein:

FIG. 3 is a fragmentary top plan view taken along the lines 3—3 of FIG. 1 in the combined planes of the drive and driven members and at an angle to the plane of the frame;

FIG. 4 is a fragmentary side view of the suspension taken from the point of view of lines 4—4 of FIG. 3;

DESCRIPTION OF THE PREFERRED EMBODIMENT

Figure 1:
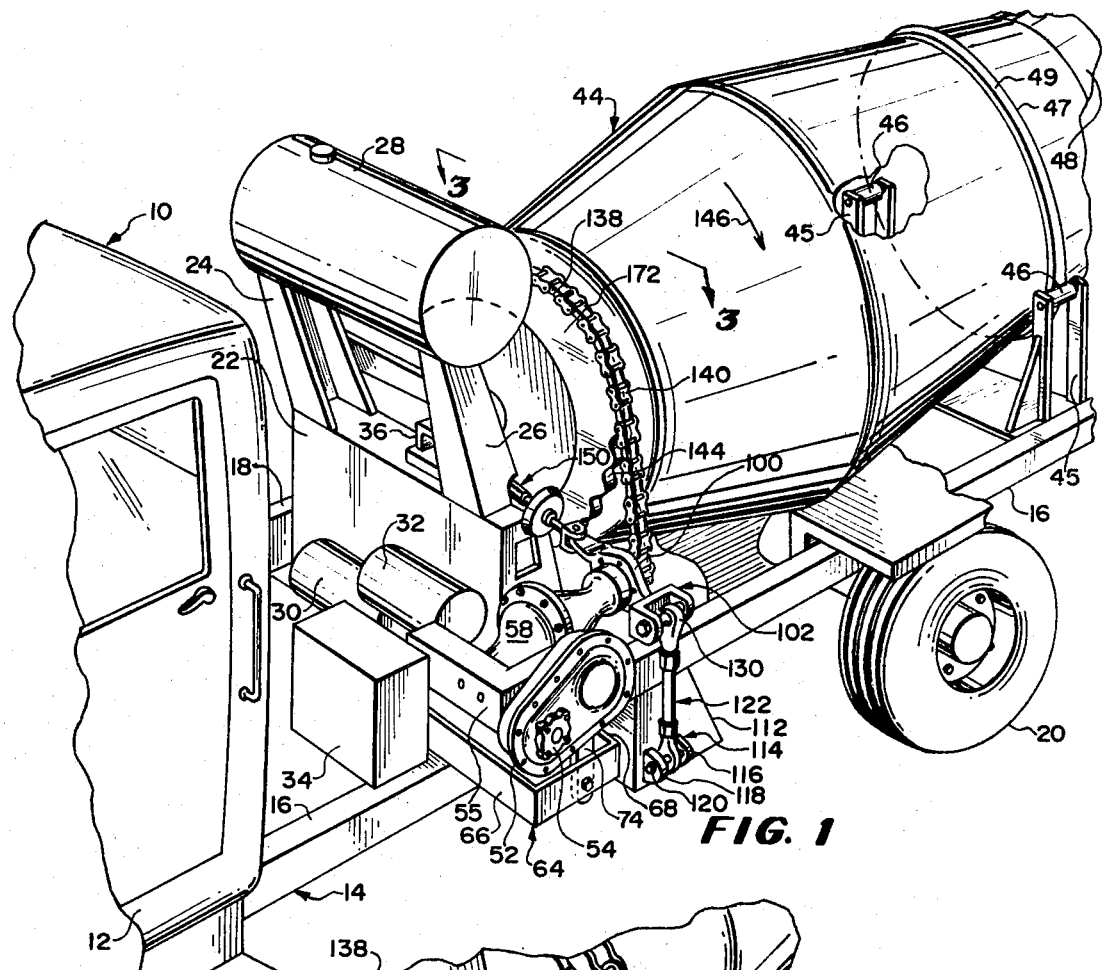
FIG. 1 is a fragmentary perspective view showing the general arrangement of the suspension for the drive unit of this invention as applied to a ready-mix truck and also illustrating the twin roller bearing mount used for the rear end of mixer drum.
Figure 2:
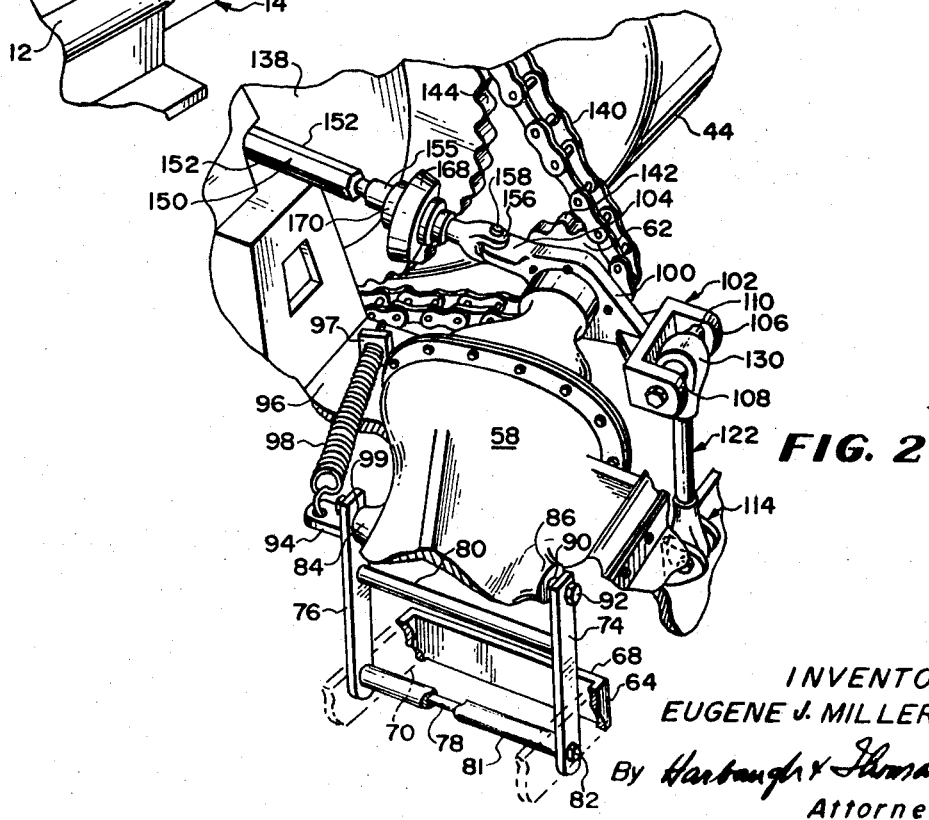
FIG. 2 is a fragmentary perspective view of the suspension unit with parts cut away to show the details of the mounting.

Referring to the drawings in which the reference characters designate like parts, there is shown a ready-mix truck 10 which incorporates a power take-off unit or drive unit having the suspension of the present invention. The truck 10 comprises the cab 12 supported on the frame 14 having the longitudinal side members 16 and 18, with suitable transverse front and rear cross members (not illustrated), to support the cab and carry the tired wheels, only one of which is illustrated at 20, and provide steering and motive power for the truck as is known in the art. The truck frame includes the rigidifying box frame 22 affixed between the side members 16 and 18, just behind the cab 12 with the spaced stanchions 24 and 26 supporting a water tank 28 used for the purpose of supplying water to wash the equipment free of fresh concrete. Other auxiliary equipment such as accumulator 30 for the air brakes, the oil supply tank 32 for the hydraulic system and the battery box 34, is carried by the frame behind the cab.

The box frame 22 has the front bearing support members 36 and 38 (FIG. 3) which can be any desired rigid construction, carried along the center line of the frame, to hold the bearing 40 of the stub shaft or axis 42 rotatably supporting the forward end of the mixer drum 44. A similar cross frame member, and roller supports 45 as provided at the rear of the frame, with the pair of rollers 46 suitably mounted at their upper ends and positioned transversely of the frame 16. This tapered end of the mixer drum carries the circumferential track 47 and is provided with a flanged opening 48 allow passage of concrete as desired. The track surface 49 is beveled so that the rollers 46 have their axes substantially parallel to the frame 16 and so spaced as to rotatably support the rear end of the mixer drum 44 on a longitudinal axis above the frame and higher at the rear than at the front. Various forms of spaced roller supports 46 are provided for the mixer drums of ready-mix trucks and the longitudinal axis about which the mixer drum rotates is thereby elevated above the front support and at an angle of about 20° to 25° to the plane of the frame. Provision is made for an opening in the rear end wall of the mixer drum to admit the concrete or its ingredients in loading the truck and to discharge the concrete at the job site. Chutes and conveyors may also be used at the rear end 48 of the mixer drum 44 to aid in discharging the concrete to a desired location. A top center hold-down roller (not shown) can be provided. Accordingly, the rear bearing or roller is a cradle of rather large diameter necessitated by the flanged opening 48. Rear spaced roller bearing supports of this type are particularly subject to torsional displacement and fore and aft shifting of the drum 44.

In any event, the mixer drum 44 is rotatably supported by rigid front and non-rigid rear bearing supports above the frame 14 in a manner to be influenced by the torsional action of the frame as the wheels 20 negotiate deviations in the grade whether within or beyond the limits of movement of the trucks spring system, front and rear of the frame. These torsional shifting forces are ever present in a truck of this nature and are magnified by the size (length and capacity) and weight of the mixer drum requiring a longer frame. Furthermore, trucks, such as this are called upon to negotiate any terrain over which the driver can possibly make it travel, often to the detriment of the auxiliary power drive for the mixing drum.

In order to thoroughly mix and also dispense the contents of the mixer drum 44, means are provided to continuously rotate the drum as it transports the concrete and delivers same to the required location. Such means include an auxiliary take-off drive shaft 50 (FIG. 3) which is connected by suitable universal joints and gearing to the transmission of the truck and individually controlled by the operator through a shift lever and clutch located either in the cab or behind the cab, as desired. The power take-off shaft 50 connects to a suitable drive sprocket or gear within the transfer case 52, the end bearing housing of which is illustrated at 54. Suitable reinforcing members 55 for the power take-off are provided, affixed to the truck frame member 16, which is located so as to be convenient for servicing and also at the desired spaced relationship from the axis 42 of the mixer drum. The transfer case 52 contains a larger gear or sprocket, the bearing or axis housing of which is illustrated at 56, connected to the power unit (reduction gear) housing 58 as the final power take-off through the primary drive shaft or drive axis 60 carrying the drive member or sprocket 62.

The box frame 64, having a pair of side members 66 and 68 and a base member 70, affixed to the side frame member 16, extends outwardly from the truck to provide a rigid support under the transfer case 52 and power unit housing 58 which latter are unified and completely enclosed to protect the working parts.

Figure 5:
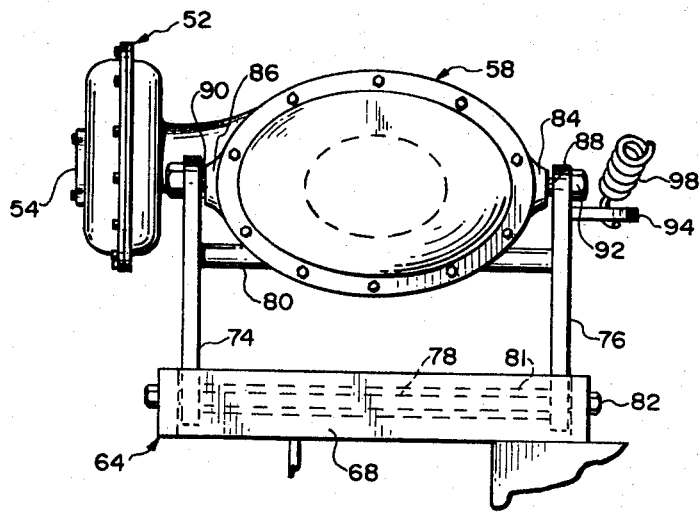
FIG. 5 is a fragmentary view of the aft end of the reduction gear housing to illustrate one form of pivotal linkage mount therefor.

As one embodiment of this invention, a pair of link members 74 and 76 is provided and supported in spaced pivotal relationship from the inside of the box frame 64. The lower ends of each link have a suitable bore hole to receive the pivot pin 78 therebetween and fit across corresponding aligned bore holes in the correspondingly spaced support members 64 and 70. Suitable bearing bushings and the like can be used so that either the links rotate upon the pin 78, the pin rotates in the members 64 and 70 or both of these rotational relationships attain. The links 74 and 76 are cross-braced and held in coplanar relationship by the rod 80 and the sleeve 81 which encompasses the pin 78 and suitable nuts 82 at the ends of the pin 78 hold the assembly to the side frame support represented by the numeral 64. FIG. 5 is an end view of this pivot assembly.

The housing 58, providing power to the drive shaft 60 and the drive sprocket 62, has a pair of oppositely facing bosses 84 and 86 receiving the axially-aligned stub shafts 88 and 90, respectively. Alternatively, the shafts 88 and 90 can be one continuous shaft through the housing. The upper ends of the links 74 and 76 are rotatably mounted to these spaced shafts and held in place by the nuts illustrated at 92. The inner linkage 76 is provided with the inwardly extending tab 94 while the stationary bracket 96, affixed to or a part of the frame assembly, has a corresponding upright tab 97 mounted to the rear of the linkage 74–76 in relation to the frame 16. Each tab has a bore hole or other suitable means to receive the ends of the tension spring 98 biasing the housing 58 to the rear about the linkages 74–76. The housing can, accordingly, pivot toward and away from the rear of the frame on the pin 78 and also pivot upwardly or downwardly on the pins 86–88. The junctures of the bosses 84 and 86 and the tube 81 with the inside of the links and junctures of the outsides of the links with the support 64 are of close tolerance to provide little or no side play.

At the rear end of the housing 58 adjacent the drive sprocket 62 there is provided the lobed flange or journal 100 affixed to or part of the housing. The outer lobe carries the bifurcated yoke member 102 and the inner lobe carries the flat tab portion 104. Although the lobed flange 100 is shown to be substantially symmetrical about the end of the housing with the yoke 102 and the tab 104 diametrically opposite each other, this arrangement is by no means critical to the functioning of the part as will become apparent as this description proceeds. The yoke 102 has the spaced tabs 106 and 108 with suitable aligned bores carrying the pivot pin 110 therebetween in spaced relationship from the body of the yoke member.

The side frame member 16 carries the bracket member 112 immediately below the rear end of the housing 58 under the journal 100, with the outwardly extending yoke member 114 attached thereto which includes the spaced tabs 116 and 118 having aligned bores to receive the pivot pin 120. The rod or torque anchor member 122, comprising adjustable telescoping members affixed by the locking ring 124 is attached between the pivot pins 110 and 120 by means of the ball swivel mounts 130 at each end. The rod member 122 and the ball swivel mounts 130 at each end, connected between the frame and the rear end of the housing 58, comprise the radial torque member of this invention. Each end of the rod member 122 can rotate about the axis of the respective pins 110 and 120 and is also free to pivot into and out of its normal generally perpendicular relationship with each pin. This imparts a double pivot action at the ends of the rod and a wrist or gibble-mount action, in addition, with only the lower end being restricted in that the axis represented by the pin 120 is fixed in relation to the frame.

The upper end of the rod or radial torque member 122 is thus capable of movement in circles of varying diameter, the centers of which are essentially a fixed, but adjustable radius or distance from the lower end. As shown in FIG. 4, the universal or gimbal mounting is partially illustrated by the ball portions 132, as integral parts of each of the pins 110 and 120 which serve as lateral or twist bearing surfaces for the encompassing mountings 130. The illustrated swivel 130 can be of the type manufactured by New Departure Bearing Co. The lock nut 124 upon being loosened, allows the mounts 130 to be extended or retracted to the desired length and then tightened to lock the rod 122 to that position.

The front wall 134 of the mixer drum has the reinforcing housing 136 to which is attached and carried the large driven sprocket or ring gear 138 encompassed by the drive chain 140. The assembly is arranged so that the large driven sprocket 138 and the drive sprocket 62 are essentially in coplanar aligned relationship and their rotational axes are laterally spaced and essentially parallel to each other, with the axis 60 being adjustable in relation to the axis 42 to allow the drive chain 140 to be received upon the respective teeth 142 and 144 in drive relationship. Accordingly, power input from the take-off shaft 50 is transmitted through the off-set drive connection in the transfer case or housing 52, to the reduction gear or transmission drive unit 58 and to the drive axis on shaft 60 for rotation of the mixer drum 44 in any desired direction indicated by the arrow 146. The sprocket sizes are chosen so that the mixer drum is rotated at about 1 to 18 rpm during the transport and unloading of concrete. During unloading of concrete the direction of rotation of the drum 44 is reversed, and this action, coupled with the resulting load displacement also causes mis-alignment of the drive sprocket which is overcome by this invention.

Referring back to the lobed flange-journal 100 and its inner tab 104, it is seen that the roller or radial alignment rod member 150 comprising the outer octagonal housing 152 in threaded engagement upon the inner rod 154, is affixed or linked thereto by means of the yoke member 156 and the pivot pin 158 extending through suitable aligned bores. The other end of the roller alignment member 150 has the flattened end portion 160 received within the fixed bracket 162 by means of the pivot pin 164 carried by the fixed support 166 which is part of the structure constituting the support for the front end of the mixer drum 44.

As shown in FIG. 3, the upper pivot pin 164 is at or near the center of the axis 42 of the mixer drum and radially aligned with and above the axis 60 of the drive gear 62. The lower pivot pin 158 is located on a line between the axis 42 and the axis 60. Between the ends of the roller alignment rod member 150, and preferably near the outer periphery of the driven sprocket 138, there is provided the vertical alignment roller 168 carried on the larger diameter rod portion 155 by the bearing mount 170. The roller 168 can be constructed of rubber or tough plastic, for some types of equipment, although a tough metal roller is used for concrete trucks. The periphery thereof is beveled to be in the plane of the driven sprocket 138. It is seen that the spring 98 urges the housing 58 and the drive sprocket 62 to the rear or axially in relation to the driven sprocket 138 and forces the roller 168 against the outer flat surface 172 of the driven sprocket 138.

Although the roller 168 can be located anywhere along the length of the alignment member 150 it is preferably located outwardly of the axis 42 as far as possible so that the response of the device does not place undue strain on the parts and the proper mechanical advantage is imparted to the linkage. By placing the roller 168 as near as possible to the drive sprocket 62, the effective length of the lever indicated by the rod portion 155 therebetween is shortened and the response to changes in the plane of rotation of the driven sprocket 138 is increased so the drive sprocket tracks at all times with the chain 140 coming off the driven sprocket and alternatively the driven sprocket tracks at all times with the chain as it comes off the drive sprocket. In chain drive connections the chain leaves the teeth (comes off) at those positions where it first engages either the driven or drive sprockets and not those portions where it is disengaging. Any misalignment of the chain causes undue wear, noise and ultimate damage to the working parts.

Figure 6:
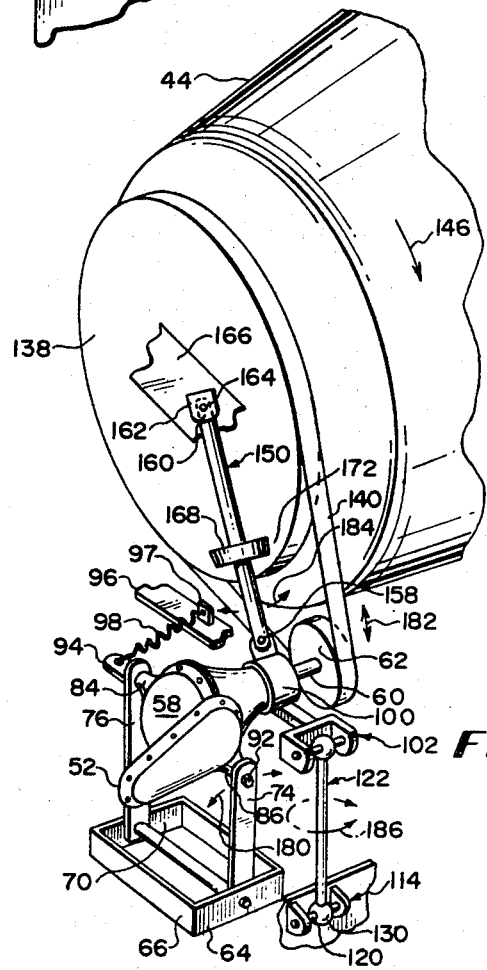
FIG. 6 is a partially diagrammatic perspective view of the assembly to show the degrees of freedom that are provided.

In the embodiment so far described, means are provided to allow the drive unit 58 and its drive sprocket 62 to move in exact and constantly aligning relationship with any twisting action the frame may have upon the driven sprocket 138 so that the chain 140 does not come off either sprocket. The system is capable of maintaining correct alignment even with the extreme twisting of the frame. These functions are illustrated in FIG. 6.

The vertical arms or links 74–76 allow fore and aft swing of the drive unit 58 along the arc indicated by the arrow 180. The arrow 182 indicates the slight vertical component of pivot motion of the drive unit about the axis 88–90 at the ends of these links under the control of the torque anchor 122, while the arrow 184 represents the radial control component of movement imparted by the roller arm 150 as the roller 168 maintains the drive unit in alignment with the driven member and carries the load of the drive unit under the bias of the spring 98. As the mixing drum rotates the roller 168 rides or rotates upon the circumferential bearing surface 172, provided on the front side of the driven sprocket 138 or alternatively by the flat end of the mixer drum. The traversing radial torque anchor 122, with its ball swivel mounting, is tied or linked as an extension of the roller arm 150 to allow these degrees of freedom to coexist in harmony as represented by the circular arrow 186.

Accordingly, the plane of the drive sprocket 62 is constantly maintained coincident with the plane of the driven sprocket 138 as shown by the in-line relationship of FIG. 3. If this relationship is upset by a twisting of the frame, bouncing of the mixer drum, changes in torque on the drive units or sudden application of the vehicle brakes, as indicated by the broken line A–B in FIG. 3, the mounting allows the drive sprocket 62 to move to the rear (in this instance) and turn slightly at the pivots 158 and swivels 130. The restraint of both the roller 168 and the anchor 122 cause the drive sprocket to come within the plane represented by the line A–B. The roller arm 150 is also used to adjust the tightness of the chain 140 about the sprockets to the specified amount. The traversing torque anchor 122 yields to these adjustments.

In effect, the drive sprocket 62 is journaled in a floating linkage which can pivot up and down and fore and aft and are axially off-set from each other. This floating linkage is maintained at a fixed radius from the center of the driven sprocket 138 and given a swivel action at its outer end; all biased toward the driven sprocket by the spring 98. It is to be observed that the axes of the pins 158 and 164 are normal to the longitudinal axis of the radial arm 150 and allow the radial arm to pivot in a plane which includes the longitudinal axes of both the drive shaft 60 and the driven shaft 42. Also, the roller arm 150 (see FIG. 3) and the flange journal 100 do not lie in a common plane, although the flange 100 and the torque anchor 122 have their longitudinal axes substantially co-planar. This arrangement places the thrust of the roller arm as close as possible to the drive sprocket 62 making the unsupported length of the drive shaft 60 as short as possible and places less strain on the bearing in journal flange 100.

Referring to FIG. 4, it is seen that the longitudinal axis of the torque anchor 122 is off-set from the plane of the chain drive in one position of the parts, and is not perpendicular to the drive axis 60, its pivot pins 110 and 120 being parallel are oriented fore and aft with the frame 16. This is a compromise position to allow the greatest pivoting action at the torque anchor to accommodate the twist of the frame and fore and aft movement of the drive unit 58 and different drive shaft angles in relation to the frame. The torque anchor 122 should be as long as possible and the longitudinal axis of 122 is always inside the plane of the driven member in relation to the vertical inclination of the sprocket 138 in relation to the truck frame 16.

It is apparent from the foregoing description that the invention is not to be limited to the particular orientation of the parts shown in the drawings. The journal 100 can be on the other or rear side of the drive sprocket 62 and the axis 42 of the mixer drum can extend forwardly instead of rearwardly of the frame support 16-18. The relative sizes of the drive and driven sprockets is immaterial to the proper functioning of the parts and instead of a speed reduction a speed increase can be attained with the drive sprocket larger than the driven sprocket. The pin 164 is preferably in line with and intersecting the axis of rotation 42 of the working member.

Similarly, the pivots or links 74-76 need not be under and supporting the housing 58 for the drive unit and these linkages can be located above the housing so that it hangs from the linkages. Although a pair of linkages is shown, one of them can be eliminated i.e., a single linkage of proper strength and suitably journaled will serve the same purpose. Also, the torque arm 122 can be reversed with the lower yoke member 114 above the yoke member 102, that is in a position 180° from that shown.

The unit will function properly without the spring 98 because the chain 140 is in guided relationship upon the teeth of the sprockets when under the driving load of rotating the drum 44. However, when the drive unit is slack or coasting and the brakes are applied the spring 98 prevents the drive unit 58, which is fairly heavy, from pivoting forward suddenly and causing the chain to walk off of the teeth. Alternatively, the roller arm 150 can be replaced by a stout stub shaft made integral with the journal 100 and extending radially toward the front bearing 42 with the roller 168 at the extended end for engagement with the surface 172 or the flat end of the mixer drum, provided an alternate means such as a turn-buckle is used to pull the journal 100 away from the axis 42 to maintain the chain or belt drive in taut condition. It is also apparent that the torque anchor 122 is preferably of sufficient length that the curvature of swing of the upper end does not interfere with the following action of the drive unit 58. The drive and driven members can be reversed, that is, the housing 58 can represent the driven member and the mixer drum 44 can represent the drive member for other applications of the invention.

Accordingly, this invention provides a drive unit for a drive member and a frame-supported driven member connected therebetween by an encompassing endless flexible member, the axes of which are subject to torsional disturbances. The unit includes housing means journaling the drive means along the drive axis in radially spaced substantially co-planar relationship from and operatively connected to the driven member by the flexible endless member. Also included are the pivotal support means for the housing for axial and angular movement of the drive axis along the driven axis, the radially oriented arm means to maintain the spaced relationship of the drive and driven axes, the anchor means so connected to allow a circular moment of freedom to the housing means which traverses the plane of said drive and driven axes and the roller means carried by the roller arm biased against a substantially flat end portion of said driven means which rotates therewith as a part or extension thereof in a plane substantially perpendicular to the driven axes.

What is claimed is:

1. A drive unit for a drive member and a frame-supported rotatable driven member connected by an encompassing endless flexible member, the respective drive and driven axes of which are subject to torsional disturbances, comprising:
   means housing and journaling said rotatable drive member along said drive axis in radially spaced substantially co-planar relationship from and operatively connected to said rotatable driven member through circumferential engagement with said flexible member;
   said driven member having a flat side surface rotatable in a plane substantially perpendicular to said driven axis;
   means pivotally supporting said housing means from said frame support for axial and angular movement of the drive axis along the driven axis;
   radially oriented arm means pivotally connected for movement substantially in the plane of said drive and driven axes with one end thereof connected to said frame support and the other end connected to an inner side of said housing means to maintain said radially spaced relationship of said drive and driven axes;
   anchor means universally connected at one end to an outer side of said housing means and at the other end to said frame support allowing a circular moment of freedom to said housing means traversing the plane of said drive and driven axes;
   roller means intermediate the ends of said arms means for rotational contact with said side of said driven member; and
   means biasing said housing means and drive member about said pivotal support with said roller means in idling rotational contact with the side of said driven member whereby the planes of rotation of said drive and driven members are maintained coincident during torsional displacement therebetween.

2. A drive unit in accordance with claim 1 in which:
said rotatable drive member and said rotatable driven member are sprockets and said endless flexible member is a roller chain.

3. A drive unit in accordance with claim 1 in which:
said rotatable drive member and said rotatable driven member are sheaves and said endless flexible member is a belt.

4. A drive unit in accordance with claim 1 in which:
said means pivotally supporting said housing means comprises a linkage pivoted at one end to said frame support and pivoted at the other end to said housing means.

5. A drive unit in accordance with claim 1 in which:
said radially oriented arm means is connected to said frame support substantially coincident with the center of rotation of said driven means.

6. A drive unit in accordance with claim 1 in which:
said radially oriented arm means is connected to said frame support on an axis substantially perpendicular to the plane of said drive and driven axes.

7. A drive unit in accordance with claim 1 in which:
said housing means includes a journal rotatably supporting said drive means;
the inner sides of said journal carrying said radially oriented arm means includes a pivot mount therefor and the outer side of said journal includes a swivel mount for said anchor means, the longitudinal axis of which is spaced from said drive axis and at an angle to the plane of rotation of said driven member.

8. A drive unit in accordance with claim 7 in which:
said anchor means is suspended between said frame support and said journal by means of a swivel mount at each end.

9. A drive unit in accordance with claim 1 in which:

the pivotal connection of said radially oriented arm means with said frame support is aligned with said driven axis.

10. A drive unit in accordance with claim 1 in which:
said radially oriented arm means includes means to change the effective length thereof and adjust tightness of said endless flexible member upon said drive and driven members.

11. A drive unit in accordance with claim 1 in which:
said anchor means includes means to change the effective length thereof and adjust the loci of the center of said circular moment of freedom of said housing means.

12. A drive unit in accordance with claim 1 in which:
said drive member is a drive sprocket extending from said housing means, the rotatable driven member is a driven sprocket carrying therewith a mixer drum for rotation by means of a drive chain therebetween;
said mixer drum is mounted on a fixed axis at said driven sprocket and an inclined roller axis spaced therefrom;
and said frame support comprises the wheel-mounted, elongated frame of a ready-mix concrete truck.

13. A drive unit in accordance with claim 12 in which:
the inclined axis of said mixer drum and the axis of said drive sprocket are oriented at an angle to said frame support along its longitudinal axis and said roller axis comprises a pair of laterally spaced rollers supported by said frame and engaging the under curved side of said mixer drum in rolling contact.

14. A mounting for the power take-off-unit of a concrete ready mix truck having a mixer drum rotatably mounted on the frame thereof between a front fixed bearing support and an inclined rear roller support, said power take-off-unit having a drive sprocket engaging a drive chain operatively engaging a driven sprocket in co-planar relationship carried at one of the bearing supports of said mixer drum comprising:
means pivotally supporting said power unit from said frame for axial and angular movement of the drive sprocket along its axis;
radially oriented arm means pivotally mounted for movement substantially in the plane of the axes of said sprockets, with one end thereof connected to said frame substantially central of the axis of said driven sprocket and the other end thereof connected to an inner side of said power unit to maintain the radially spaced relationship between said sprockets;
anchor means universally connected at one end to the outer side of the power unit and at the other end to said frame allowing a circular moment of freedom to said power unit traversing the co-planar sprockets;
roller means mounted upon said other end of said arm means for rotational idling contact with the rotating end of said mixer drum; and
means biasing said power unit and drive sprocket about said pivotal support with said roller means maintained in said idling rotational contact whereby the co-planar relationship of said sprockets is maintained irrespective of torsional and longitudinal displacements of said frame and bearing supports for said mixer drum.

15. A mounting for a power take-off-unit in accordance with claim 14 in which:
the means pivotally supporting said unit comprise a pair of linkages pivoted at their respective ends upon vertically spaced parallel transverse axes, one of which extends substantially centrally of said unit and the other of which is carried by said frame.

16. A mounting for a power take-off-unit in accordance with claim 14 in which:
said radially oriented arm means includes a pair of threadably engaging rod members adapted to be rotated in relation to each other and thereby adjust the tightness of said drive chain about said sprockets.

17. A mounting for a power take-off-unit in accordance with claim 14 in which:
said anchor means includes a pair of threadably engaging rod members adapted to be rotated in relation to each other and thereby adjust the loci of the center of said circular moment of freedom of said unit.

18. In a chain drive unit having a drive sprocket connected to a driven sprocket attached to a mixer drum mounted for rotation on an inclined axis upon a ready-mix truck, the combination of:
linkage means pivotally supporting said chain drive unit for oscillation of said drive sprocket along its rotational axis in a plane fore and aft and parallel to the inclined axis of said mixer drum;
means holding the inner side of said drive unit a fixed radial distance from said driven sprocket to tauten said chain drive unit;
a torque anchor holding the outer side of said drive unit in a plane tangential to the driven sprocket; and
a roller follower carried by said drive unit and engaging the rotating end of said mixer drum to maintain the drive sprocket and driven sprocket in following relationship.

* * * * *